United States Patent
Ogasa (12)

(10) Patent No.: US 6,293,590 B1
(45) Date of Patent: Sep. 25, 2001

(54) MOUNTING STRUCTURE OF A FUEL TANK FOR VEHICLE

(75) Inventor: Hiroshi Ogasa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/310,989

(22) Filed: May 12, 1999

(30) Foreign Application Priority Data

May 18, 1998 (JP) .................................................. 10-135712

(51) Int. Cl.⁷ ........................................................ B60P 3/22
(52) U.S. Cl. ............................ 280/834; 280/831; 220/562
(58) Field of Search ................................ 180/65.1, 68.5, 180/69.4, 69.5, 309; 280/830, 831, 832, 834; 220/562, 62.19, 62.11, 62.15

(56) References Cited

U.S. PATENT DOCUMENTS

| | | | |
|---|---|---|---|
| 3,615,848 | * | 10/1971 | Sibenhorn ........................ 136/86 B |
| 3,830,326 | * | 8/1974 | Hartung ............................. 180/66 B |
| 3,884,255 | * | 5/1975 | Merkle ................................ 137/265 |
| 4,016,836 | * | 4/1977 | MacKay et al. ........................ 123/3 |
| 4,211,537 | * | 7/1980 | Teitel .................................... 48/191 |
| 4,523,548 | * | 6/1985 | Engel et al. ......................... 123/1 A |
| 5,323,953 | * | 6/1994 | Adderley et al. .................... 228/157 |
| 5,370,418 | * | 12/1994 | Pugh .................................. 280/830 |
| 5,443,578 | * | 8/1995 | Davis, Jr. ............................. 280/834 |
| 5,673,939 | * | 10/1997 | Bees et al. ........................... 280/831 |
| 6,013,385 | * | 1/2000 | DuBose ................................. 429/17 |

FOREIGN PATENT DOCUMENTS 8-99542   4/1996  (JP) .

\* cited by examiner

Primary Examiner—Brian L. Johnson
Assistant Examiner—Daniel Yeagley
(74) Attorney, Agent, or Firm—Sughrue, Mion, Zinn, Macpeak & Seas, PLLC

(57) ABSTRACT

First, second and third fuel tanks 38a, 38b and 38c each packed with adsorbent 39 can be shaped to any desired forms and are installed within space regions 36a, 36b and 36c that are defined by two longitudinal frame beams 26 and 28 and four transverse frame beams 30b, 30c, 30d and 30e. These arrangements provide a space saving mounting structure of fuel tanks on automobiles fueled with natural gas.

2 Claims, 5 Drawing Sheets

MOUNTING STRUCTURE OF A FUEL TANK FOR VEHICLE

BACKGROUND OF THE INVENTION

This invention relates to a mounting structure for a fuel tank on vehicle, such as an automobile that use natural gas and the like as fuels.

Automobiles that use natural gas for fuel (which are hereinafter referred to as "automobiles of the prior art") are equipped with fuel tanks for storing the natural gas in a compressed state. As typically shown in Japanese Patent Unexamined Publication No. Hei. 8-99542, the fuel tank is cylindrical in shape so that the pressure of the contained gas is distributed uniformly in its interior. If one wants to install the cylindrical fuel tank in an automobile, the installation area is limited by its size and shape and a typical example is within a part of the space of the trunk at the rear of the car.

Thus, the installable area of the fuel tank is limited in the automobiles of the prior art. In addition, the fuel tank requires so much installation space that if it is installed in the trunk of the car, the availability of the trunk space is reduced.

The fuel tank must withstand high pressure and the costs of manufacture and quality control increase unavoidably. What is more, the fuel tank must satisfy various regulations on safety and this also contributes to increase the overall cost.

In order to deal with these difficulties, one may think of liquefying natural gas and storing it in the car. To this end, the natural gas has to be held at a cryogenic temperature (say, about −161° C.) within a tank capable of excellent heat insulation (such as one having an evacuated dual-wall structure) and this is another cost increasing factor in the development and manufacture of the fuel tank. As a further problem, a special mechanism such as a vapor chamber for evaporating the liquefied natural gas must be provided and this not only increases the complexity of the system but also requires cumbersome maintenance and management procedures. As a result, the overall cost of the vehicle is increased and at the same time the weight of the car body is increased to cause a significant increase in the cost of servicing the vehicle.

SUMMARY OF THE INVENTION

The present invention has been accomplished under these circumstances and has as its objective providing a mounting structure of a fuel tank that allows for effective space utilization without increasing the manufacturing cost and which yet is simplified in construction.

The stated object of the invention can be attained by a mounting structure of a fuel tank characterized in that a fuel tank packed with a fuel gas storing adsorbent is installed in a space region defined by two longitudinal frame beams provided under the floor portion of an automobile to extend in the direction in which the automobile advances and a plurality of transverse frame beams that span said longitudinal frame beams to run generally perpendicular to the direction in which the automobile advances.

Unlike in the prior art, no part of the trunk space of the automobile is sacrificed an the space within the car body is effectively utilized.

If desired, the fuel tank may be divided into a plurality of sections so that they are respectively installed in a plurality of space regions that are defined by said two longitudinal frame beams and said plurality of transverse frame beams. The shapes of the individual sections of the fuel tank are determined in accordance with the assembly construction of said longitudinal frame beams and said plurality of transverse frame beams and those sections are installed within said plurality of space regions so as to realize more effective utilization of the space within the car body.

In another embodiment, an exhaust line for the automobile is provided in proximity to the fuel tank and a fuel cooling pipe through which water for cooling the engine of said automobile circulates is provided to extend along said fuel tank so that the temperature of the fuel gas within said fuel tank is controlled with the exhaust gas flowing through said exhaust line and the cooling water flowing through said fuel cooling pipe. The cooling water and the heat of the exhaust gas are effectively used to control the adsorption of the fuel gas on the adsorbent and its desorption from the adsorbent, thereby achieving a further improvement in the storage efficiency of the fuel gas.

If desired, temperature sensors may be provided on the fuel tank and the fuel cooling pipe so that the flow of the cooling water circulating through said fuel cooling pipe is controlled on the basis of the temperature data as detected with said temperature sensors. The temperature of the fuel gas in the fuel tank is controlled in such a way that the fuel gas is adsorbed on the adsorbent and desorbed from it in an optimal state, thereby achieving an even greater improvement in the storage efficiency of the fuel gas.

PREFERRED EMBODIMENTS OF THE INVENTION

Preferred embodiments of a mounting structure of a fuel tank according to the present invention are hereunder described in detail with reference to the accompanying drawings.

Figure 1:
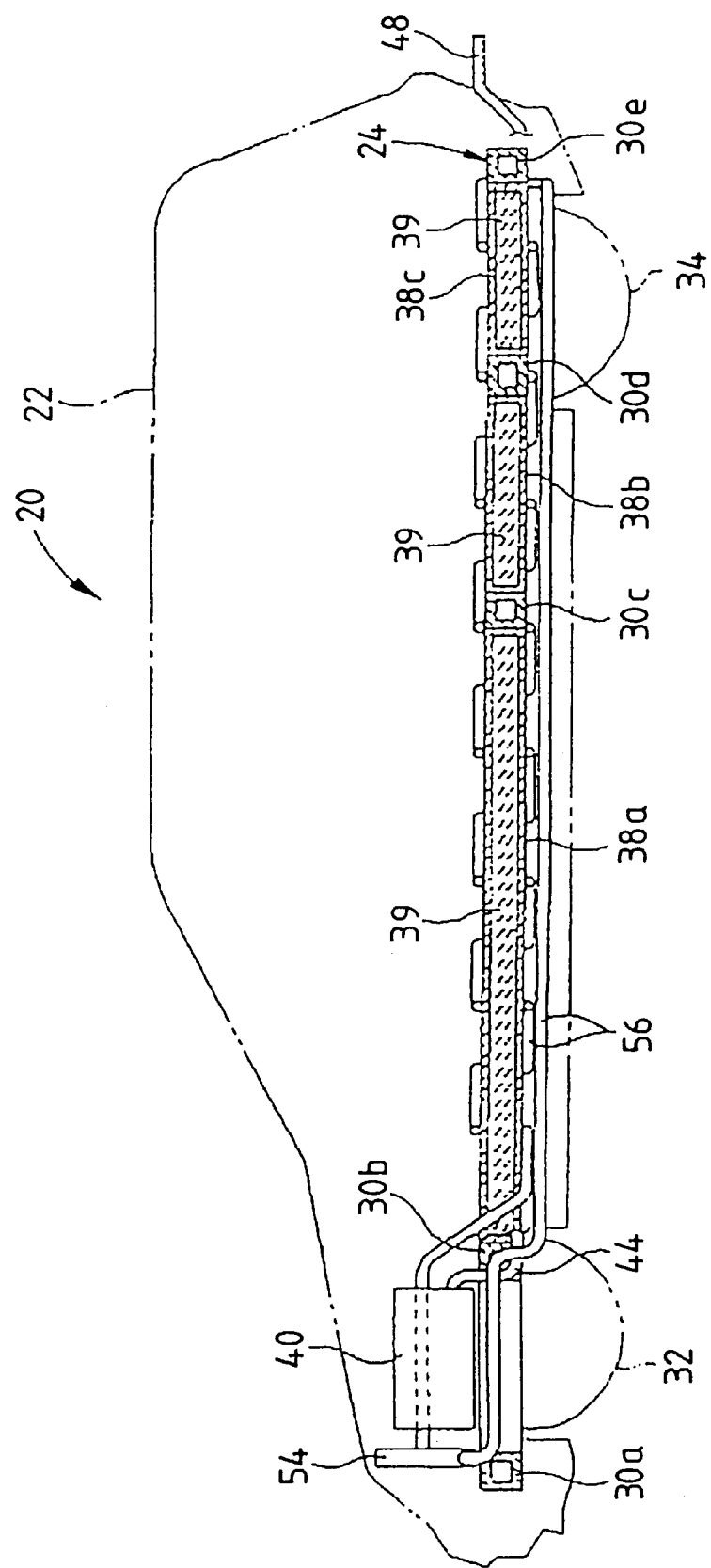
FIG. 1 is a side view of an automobile to which a mounting structure of a fuel tank according to a preferred embodiment of the invention is applied.
Figure 2:
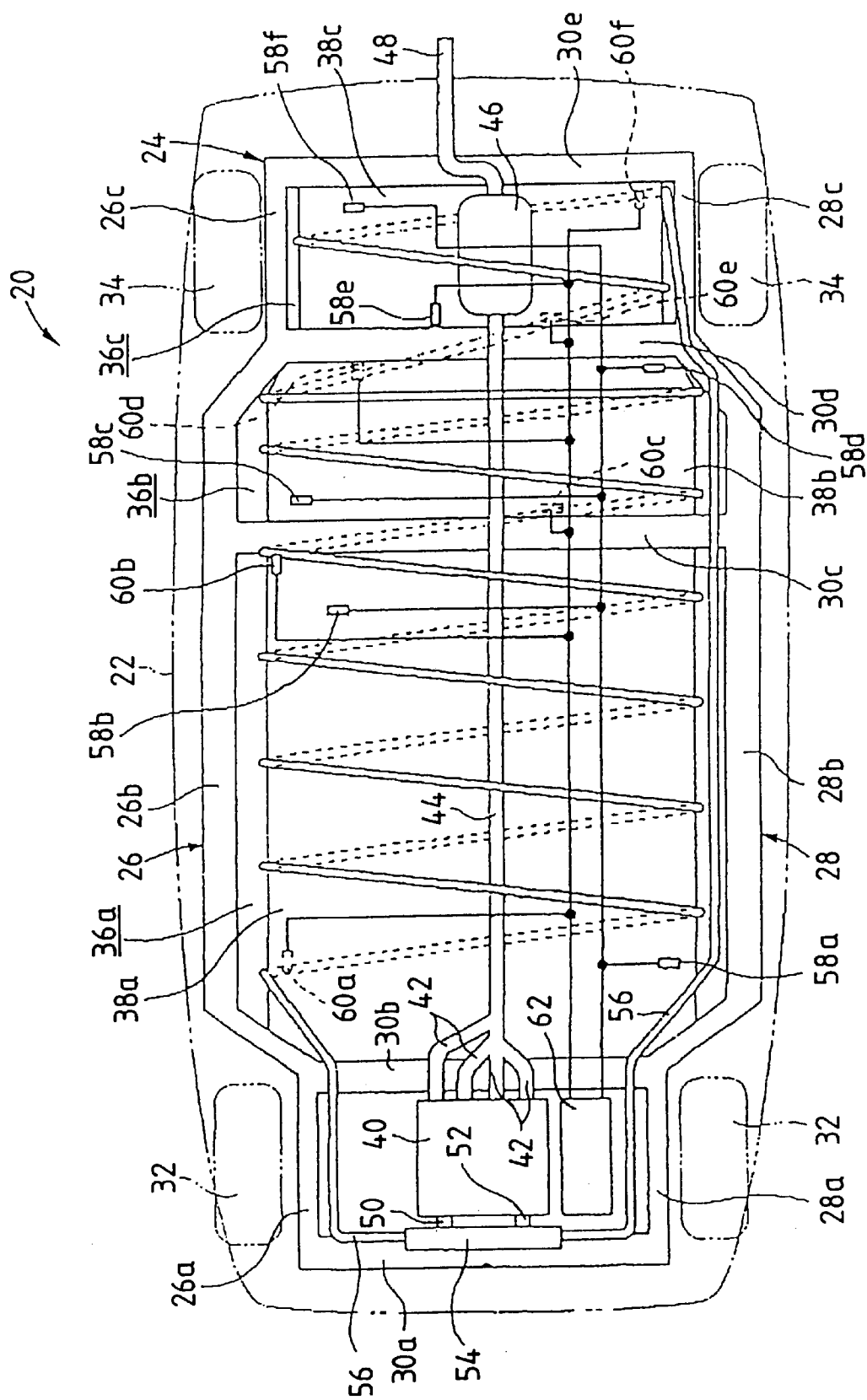
FIG. 2 is a bottom view of the automobile to which the mounting structure of a fuel tank according to the preferred embodiment of the invention is applied.

Shown by 20 in FIG. 1 is an automobile to which a mounting structure of a fuel tank according to a preferred embodiment of the invention is applied. It comprises a body 22 which is turn has a frame 24 constituting the floor portion. The frame 24 may be integral with the body 22 (as shown in FIG. 2) or separate from it. The frame 24 consists of two longitudinal frame beams 26 and 28 that extend in the direction in which the automobile 20 advances, as well as five transverse frame beams 30a, 30b, 30c, 30d and 30e that span said longitudinal frame beams 26 and 28 to run generally perpendicular to the direction in which the automobile 20 advances.

The front end portions 26a and 28a of the longitudinal frame beams 26 and 28 (the front being with respect to the direction in which the automobile 20 advances) are spaced apart by a smaller distance than the wide-apart portions 26b and 28b of the longitudinal frame beams 26 and 28. The front ends of the less wide-apart front end portions 26a and 28a are connected by the transverse frame beam 30a. The joint between the front end portion 26a and the wide-apart portion 26b and the joint between the front end portion 28a and the wide-apart portion 28b are connected by the transverse frame beam 30b. The two transverse frame beams 30a and 30b are spaced apart to extend parallel to each other. The front end portions 26a and 28a support the axle shaft coupling the front wheels 32 of the automobile 20.

Like the front end portions 26a and 28a of the longitudinal frame beams 26 and 28, their rear end portions 26c and 28c (the rear being with respect to the direction in which the automobile 20 advances) are spaced apart by a smaller distance than the wide-apart portions 26b and 28b which are in the middle of the longitudinal frame beams 26 and 28. The rear ends of the less wide-apart rear end portions 26c and 28c are connected by the transverse frame beam 30d. The joint between the rear end portion 26c and the wide-apart portion 26b and the joint between the rear end portion 28c and the wide-apart portion 28b are connected by the transverse frame beam 30e. The two transverse frame beams 30d and 30e are spaced apart to extend parallel to each other. In the same manner as the front end portions 26a and 28a of the longitudinal frame beams 26 and 28 support the front wheels 32, their rear end portions 26c and 28c support the rear wheels 34 of the automobile 20.

The wide-apart portions 26b and 28b of the longitudinal frame beams 26 and 28 are bridged by the transverse frame beam 30c which extends parallel to the transverse frame beams 30a, 30b, 30d and 30e. It should be noted that the transverse frame beam 30c is fixed in a position offset by a specified distance rearward of the centers of the wide-apart portions 26b and 28b in the longitudinal direction.

The wide-apart portions 26b and 28b of the longitudinal frame beams 26 and 28 as well as the transverse frame beams 30b, 30c and 30d define two space regions 36a and 36b, in which a first fuel tank 38a and a second fuel tank 38b are installed. The rear end portions 26c and 28c of the longitudinal frame beams 26 and 28 and the transverse frame beams 30d and 30e define another space region 36c, in which a third fuel tank 38c is installed. The three fuel tanks 38a, 38b and 38c are shaped to fit in the respective space regions 36a, 36b and 36c and they are each packed with an adsorbent 39 for adsorbing and storing a fuel gas (natural gas), as shown clearly in FIG. 1. The adsorbent 39 is preferably activated charcoal made from ligneous materials such as coconut hulls or mineral materials such as petroleum pitches and coal cokes. Metals and organic matter may be other candidates for the starting material of the activated charcoal.

As shown in FIG. 2, the front end portions 26a and 28a of the longitudinal frame beams 26 and 28 as well as the transverse frame beam 30a support an engine 40. The engine 40 has an exhaust manifold 42 to which an exhaust pipe 44 and a silencer 46 are connected in sequence. A tail pipe 48 is connected to the silencer 46 which preferably contains a catalyst. The exhaust manifold 42, exhaust pipe 44, silencer 46 and tail pipe 48 make up an exhaust line through which the exhaust gas produced in the engine 40 is discharged into atmospheric air. The exhaust pipe 44 and silencer 46 are installed under the first, second and third fuel tanks 38a, 38b and 38c. The heat of the exhaust gas flowing through the exhaust pipe 44 and the silencer 46 raises the temperature of the fuel gas in the three fuel tanks 38a, 38b and 38c.

The engine 40 is also connected to a radiator 54 via a water supply pipe 50 and a water drain pipe 52. The radiator 54 is equipped with a means (not shown) of circulating cooling water through the loop consisting of those four components. Upon cooling the engine 40, the cooling water absorbs heat, is returned to the radiator 54 and dissipates the heat. An end (on the exit side) of the radiator 54 is connected to an end of a fuel cooling pipe 56. As shown in FIGS. 1 and 2, the fuel cooling pipe 56 both extends along and spirals about the first, second and third fuel tanks 38a, 38b and 38c such that the other end of the fuel cooling pipe 56 returning from the third fuel tank 38c is connected to the other end (on the entrance side) of the radiator 54. Thus, the cooling water circulating through the fuel cooling pipe 56 cools the fuel gas in the third, second and third fuel tanks 38a, 38b and 38c.

As shown in FIG. 2, the first fuel tank 38a is provided with temperature sensors 58a and 58b, the second fuel tank 38b with temperature sensors 58c, 58d, and the third fuel tank 38c with temperature sensors 58e and 58f. The temperature sensors are preferably thermocouples. As also shown in FIG. 2, the fuel cooling pipe 56 is fitted with temperature sensors 60a and 60b at the entrance and exit, respectively, of the first fuel tank 38a; similarly, the fuel cooling pipe 56 is fitted with temperature sensors 60c and 60d at the entrance and exit, respectively, of the second fuel tank 38b, and the fuel cooling pipe 56 is also fitted with temperature sensors 60e and 60f at the entrance and exit, respectively, of the third fuel tank 38c. The temperature sensors are preferably thermocouples. The first group of temperature sensors 58a, 58b, 58c, 58d, 58e and 58f and the second group of temperature sensors 60a, 60b, 60c, 60d, 60e and 60f are electrically connected to an ECU 62 which, on the basis of the temperature data as detected with these temperature sensors, controls the flow of the cooling water circulating through the fuel cooling pipe 56. As a result, the temperature of the fuel gas is controlled in such a way that the fuel gas is adsorbed on the adsorbent 39 in the three fuel tanks 38a to 38c and desorbed from it in an optimal state, thereby achieving an improvement in the storage efficiency of the fuel gas.

Thus, in the preferred embodiment of the invention, the fuel gas is stored in the first, second and third fuel tanks 38a, 38b and 38c each packed with the adsorbent 39 and this allows the three fuel tanks 38a to 38c to be shaped in any desired form. In addition, the three fuel tanks 38a to 38c are separate entities rather than in a single unitary form. Hence, the three fuel tanks 38a, 38b and 38c can be installed in the three respective space regions 36a, 36b and 36c which are defined by the two longitudinal frame beams 26 and 28 and the four transverse frame beams 30b, 30c, 30d and 30e, allowing for effective utilization of the space within the body 22 of the automobile 20.

In the preferred embodiment of the invention, the exhaust line is provided in proximity to the three fuel tanks 38a, 38b and 38c and at the same time the fuel cooling pipe 56 is provided to extend along these fuel tanks, with the temperature sensors 58a and 58b provided on the first fuel tank 38a, the temperature sensors 58c and 58d on the second fuel tank 38b, and the temperature sensors 58e and 58f on the third fuel tank 38c. In addition, the temperature sensors 60a and 60b are provided on the fuel cooling pipe 56 at the entrance and exit, respectively, of the first fuel tank 38a, the temperature sensors 60c and 60d at the entrance and exit, respectively, of the second fuel tank 38b, and the temperature sensors 60e and 60f at the entrance and exit, respectively, of the third fuel tank 38c. This arrangement ensures that on the basis of the temperature data as detected with the first group of temperature sensors 58a to 58f and the second group of temperature sensors 60a to 60f, the flow of the cooling water circulating through the fuel cooling pipe 56 is controlled and the temperature of the fuel gas in the three fuel tanks 38a to 38c is controlled in such a way that the fuel gas is adsorbed on the adsorbent 39 and desorbed from it in an optimal state, thereby achieving an improvement in the storage efficiency of the fuel gas.

We now describe a modification of the preferred embodiment of the invention. In the following description, all components that are identical to those described in connection with the preferred embodiment are identified by like numerals and will not be explained in detail.

Figure 3:
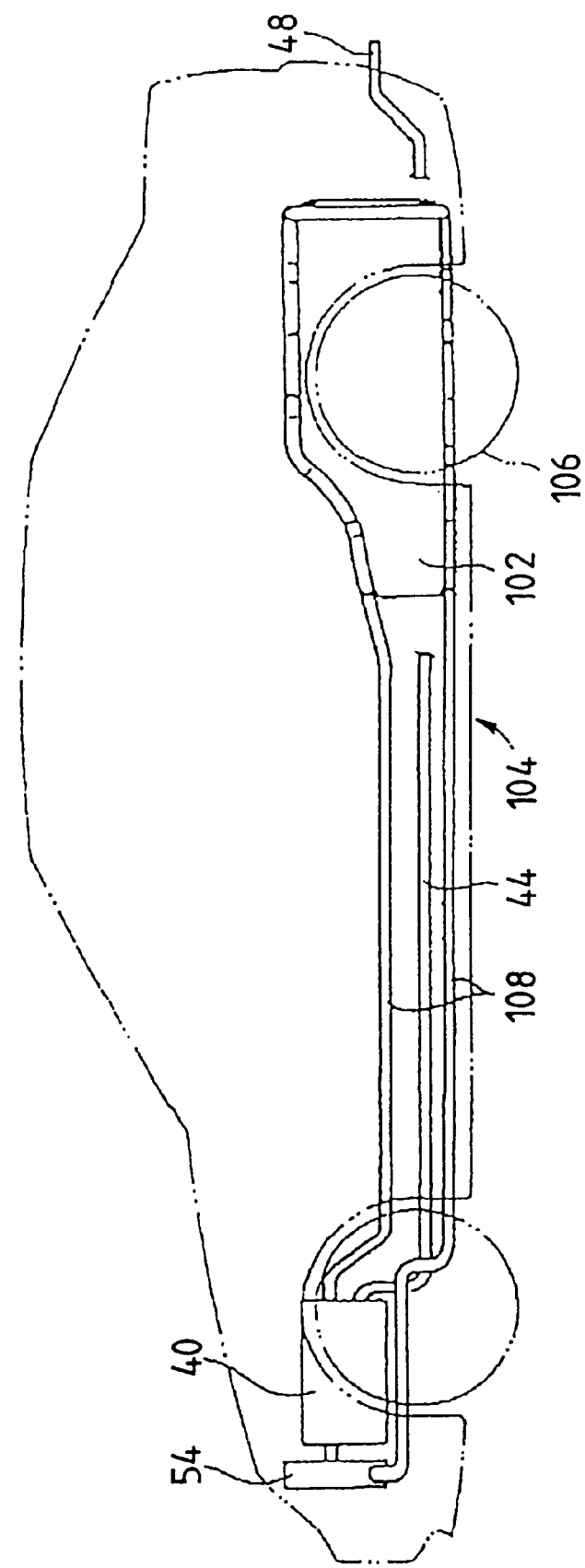
FIG. 3 is a side view of an automobile to which a mounting structure of a fuel tank according to a modification of the preferred embodiment of the invention is applied.

FIG. 3 shows a mounting structure of a fuel tank according to the modification of the preferred embodiment of the invention. Shown by 102 is a fuel tank which is installed near the rear wheels 106 of an automobile 104 in substantially the same position as where a gasoline tank is installed on a gas-fueled car. The shape of the fuel tank 102 is also substantially the same as that of the gasoline tank. As in the case of the first, second and third fuel tanks 38a, 38b and 38c, the fuel tank 102 is packed with the adsorbent 39 which adsorbs and stores the fuel gas (see FIG. 5).

Figure 4:
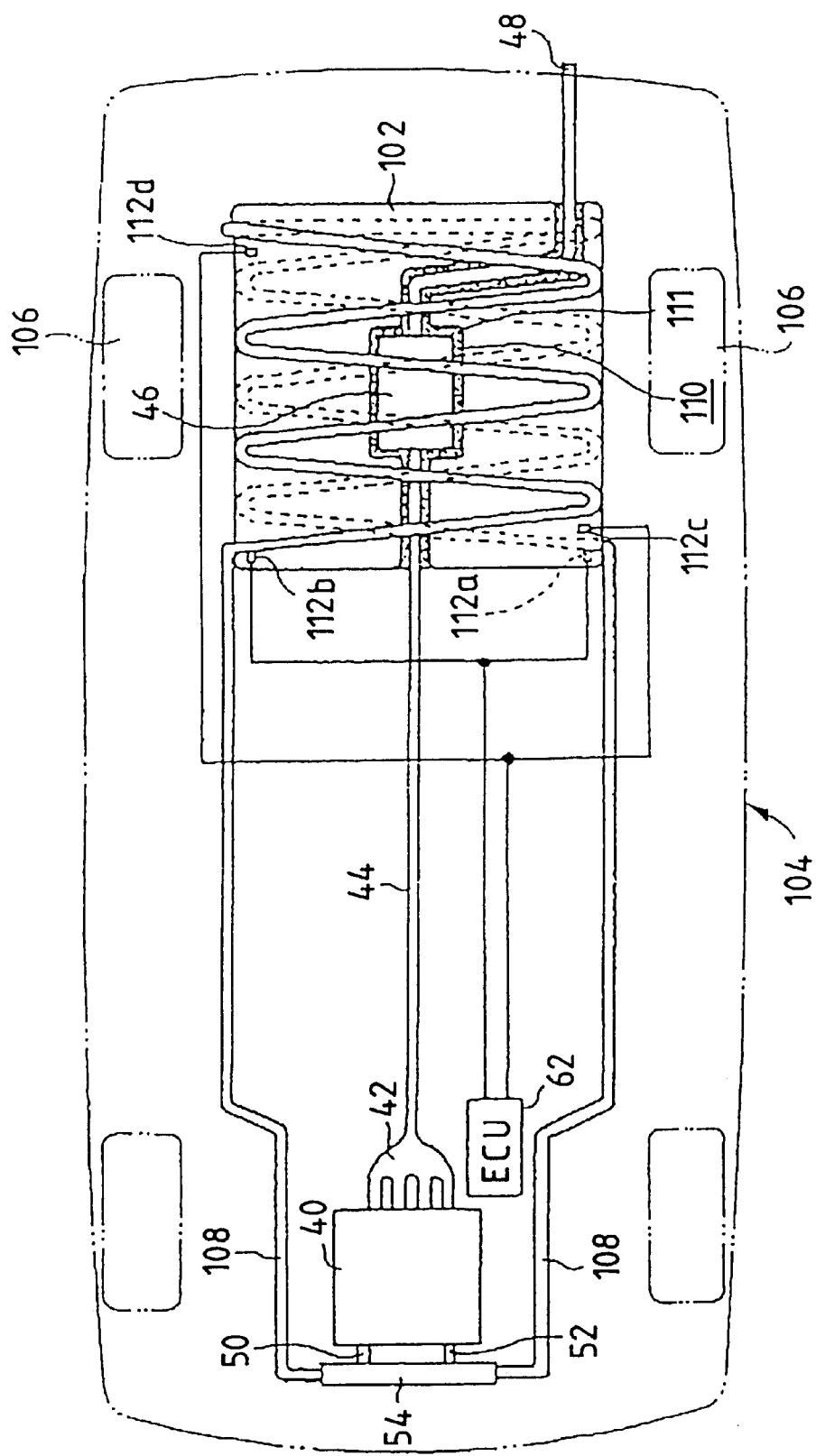
FIG. 4 is a bottom view of the automobile to which the mounting structure of a fuel tank according to the modification of the preferred embodiment of the invention is applied.
Figure 5:
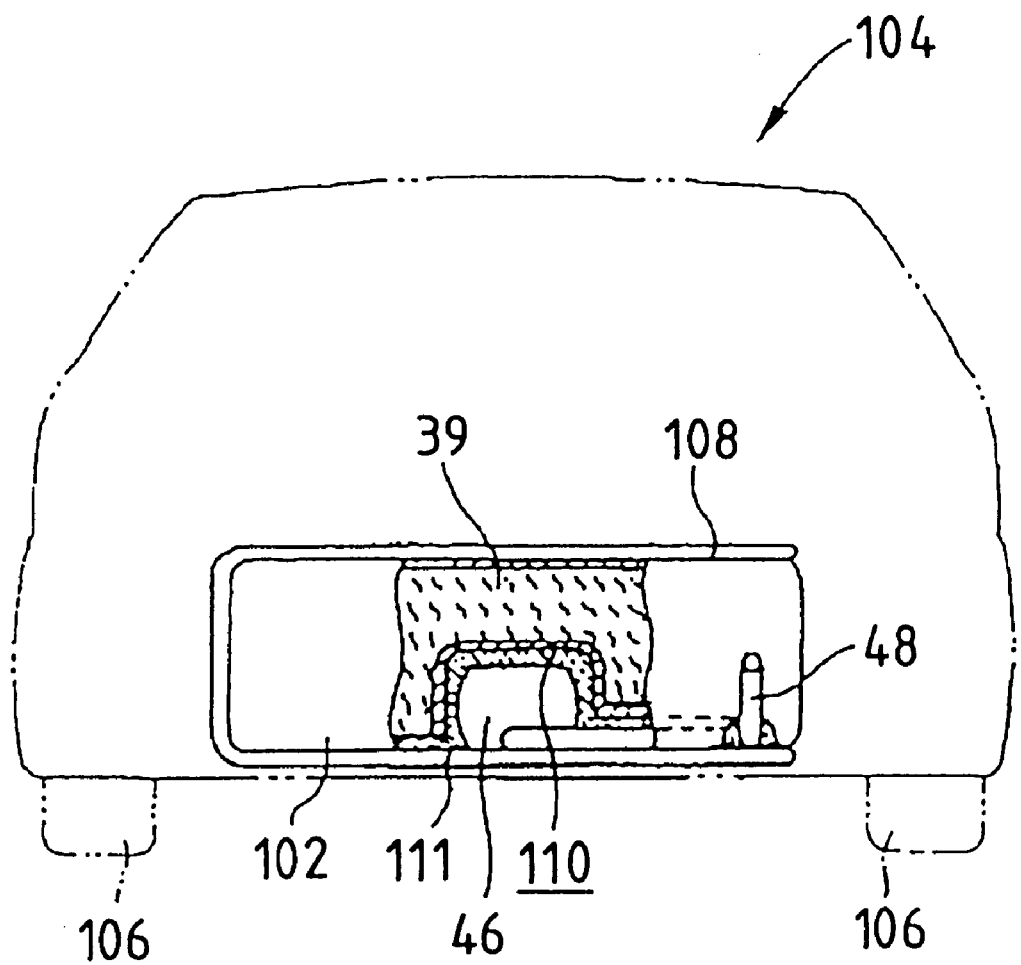
FIG. 5 is a rear view of the automobile to which the mounting structure of a fuel tank according to the modification of the preferred embodiment of the invention is applied.

The fuel tank 102 has a fuel cooling pipe 108 which, as shown in FIGS. 3 and 4, is connected to an end of the radiator 54, extends from it along the fuel tank 102 to reach the rear end and returns to the radiator 54. As shown in FIG. 5, the fuel tank 102 may have a concave space 110 for accommodating the silencer 46 and this contributes further to achieve effective space utilization. A heat insulator 111 is loaded between the shape 110 in the fuel tank 102 and the silencer 46.

As shown in FIG. 4, temperature sensors (preferably thermocouples) 112a and 112b are provided on the fuel tank 102, and temperature sensors (preferably thermocouples) 112c and 112d are provided on the fuel cooling pipe 108 at the entrance and exit, respectively, of the fuel tank 102; these temperature sensors are electrically connected to the ECU 62 which, on the basis of the temperature data as detected with the temperature sensors 112a to 112d, control the flow of the cooling water circulating through the fuel cooling pipe 108. As a result, the temperature of the fuel gas is controlled in such as a way that the fuel gas is adsorbed on the adsorbent 39 in the fuel tank 102 and desorbed from it in an optimal state.

Thus, in the modification described above, the fuel tank 102 is shaped almost like the gasoline tank on a gas-fueled car and installed in substantially the same position as the gasoline tank and these features allow for easy revamping of a gas-fueled car to a model fueled on natural gas.

As described on the foregoing pages, the present invention provides a mounting structure of a fuel tank that allows for effective space utilization without increasing the manufacturing cost and which yet is simplified in construction.

This application claims the benefit of Japanese Application No. Hei. 10-135712 which is hereby incorporated by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A mounting structure and a fuel tank on an automobile comprising:

two longitudinal frame beams provided under a floor portion of said automobile to extend in the direction in which said automobile advances;

a plurality of transverse frame beams that span said longitudinal frame beams to run generally perpendicular to the direction in which said automobile advances; and a fuel tank packed with a fuel gas storing adsorbent and installed in a space region defined by said two longitudinal frame beams and said plurality of transverse frame beams .

wherein an exhaust line for the automobile is provided in proximity to said fuel tank, and a fuel cooling pipe through which water for cooling the engine of said automobile circulates is provided to extend along said fuel tank so that the temperature of the fuel gas within said fuel tank is controlled with the exhaust gas flowing through said exhaust line and the cooling water flowing through said fuel cooling pipe.

2. The mounting structure according to claim 1, wherein said fuel tank is divided into a plurality of sections, said plurality of sections being respectively installed in a respective one of a plurality of space regions defined by said two longitudinal frame beams and said plurality of transverse frame beams.

* * * * *